Jan. 27, 1953  E. MULLEN  2,626,813
TANK TRAILER

Filed March 10, 1947  2 SHEETS—SHEET 1

INVENTOR.
Edward Mullen
BY Joseph Horley
ATTORNEY

Jan. 27, 1953     E. MULLEN     2,626,813
TANK TRAILER

Filed March 10, 1947     2 SHEETS—SHEET 2

INVENTOR.
Edward Mullen
BY Joseph Bailey
ATTORNEY

Patented Jan. 27, 1953

2,626,813

UNITED STATES PATENT OFFICE 2,626,813

TANK TRAILER

Edward Mullen, Detroit, Mich., assignor to Mechanical Handling Systems Inc., Detroit, Mich., a corporation of Michigan Application March 10, 1947, Serial No. 733,605

4 Claims. (Cl. 280—5)

This invention relates to tank trailers and more particularly to a tank trailer adapted to transport fluid loads at abnormal temperatures.

All tank trailers manufactured for use on state highways are subject to certain limitations by law which relate principally to maximum height, width and wheel and axle loads. Such limitations operate to reduce the pay loads which might otherwise be carried, and, accordingly, are major considerations in the development of any tank trailer. In order to minimize the effect of the limitations imposed by such laws, it is desirable to reduce the weight of the carrier itself to the greatest possible extent, thereby permitting the pay load to comprise as large as possible a portion of the total wheel load.

Due to the fluidity of the load which permits it to wash from side to side in a partially filled tank, it is also desirable in a tank trailer to provide as low a center of gravity for the entire trailer as is possible. This requirement is particularly important in the case of dairy trailers or those for transporting other liquids requiring a smooth interior surface for cleaning purposes which prevents the use of baffles or other means for restricting side wash of the loads. A tank of uniform section extending over the forward and rear wheels does not take advantage of all the space available above the minimum road clearance level between such wheels which could be utilized to lower the center of gravity as well as to increase capacity. Accordingly, it is desirable to provide a tank construction which will extend into such available space. However, a nonuniform tank section such as is required for this purpose introduces problems in complexity and high cost of construction, and the irregular contours are normally weaker in design requiring extra bracing which tends to increase the weight of the vehicle for any given volume carried.

In the case of a tank trailer to be used for dairy products or other liquids which have to be maintained at a temperature other than atmospheric, additional problems of insulation are combined with those already mentioned. While the use of such metals as aluminum are advantageous in the construction of a trailer from the standpoint of minimizing weight, characteristics of high thermal conductivity have generally prevented their use where temperature differentials must be maintained.

Since the weight of the running gear is a major component of the total dead weight of a tank trailer, a light construction for the running gear as well as the tank proper plays an important part in reducing thhe dead load of the trailer to a minimum. Furthermore, a running gear which is relatively efficient in absorbing road shock makes possible the use of relatively light construction in the other components of the trailer which are stressed by road shock. Where, as in the present case, the tank proper forms one of the principal stresed members in supporting the load intermediate the forward and rear running gear, a saddle suspension which directly distributes supporting thrust from the running gear to a plurality of points around the adjacent end of such tank is likewise highly desirable and effective in reducing the total weight of the running gear suspension.

It is the principal object of the present invention to provide a tank trailer adapted for use in transporting dairy products which will make possible the use of an aluminum or light metal construction in the tank proper and which will, at the same time, meet or answer all of the requirements and problems outlined above.

More specifically, it is an object of the present invention to provide a fabricated tank having a relatively small cross section at the end portions which overlie the supporting running gear and a relatively large central cross section having a lower level extending substantially to the minimum road clearance level.

Another object is to fabricate such tank with the use of geometric sections having maximum strength and volume characteristics.

A further object is to provide such tank with a construction permitting each of the sections of the tank to be developed from flat plate or sheet metal rolled to the contours required.

Another object is to provide an inner tank and a spaced outer tank shell with air space or other means of insulation therebetween.

A further object is to provide insulated connections between the inner tank and outer shell which will inhibit the heat transfer through such connections.

Another object is to provide the greatest strength possible consistent with minimum weight requirements by utilizing the tank proper as a stressed member for supporting the load in combination with girder members running longitudinally along the lower portion of each side of the tank which serve to partially support the central portions of the tank.

A further object is to provide a double wall tank construction wherein the interior of the inner tank may be smoothly finished throughout in order to avoid accumulated deposits of the load in cracks or corners and to otherwise facilitate cleaning of the tank.

Another object is to provide a tank construction having the above characteristics which may be simply and economically manufactured and assembled.

These and other objects will appear more clearly from the following detailed description of a particular embodiment of my invention and from an examination of the drawings forming a part hereof wherein, Fig. 1 is a side elevation of the tank trailer.

Figure 1:
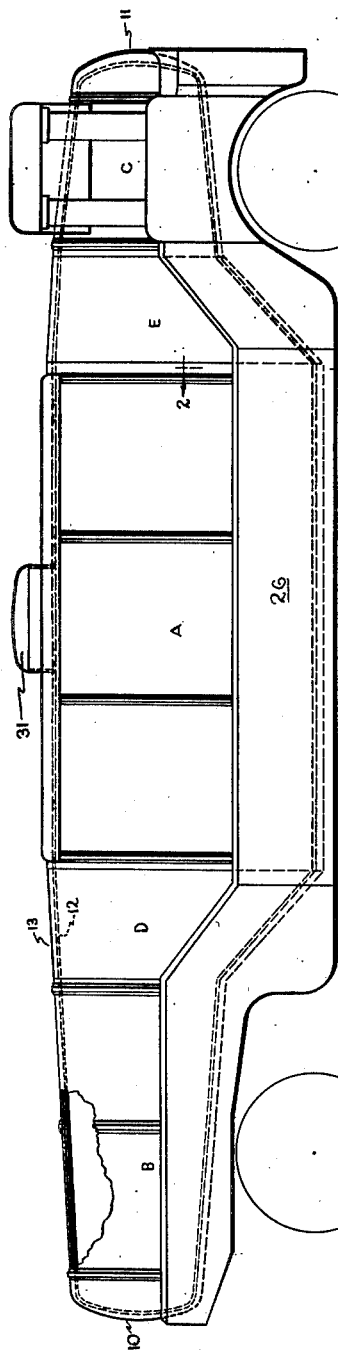
Figure 8:
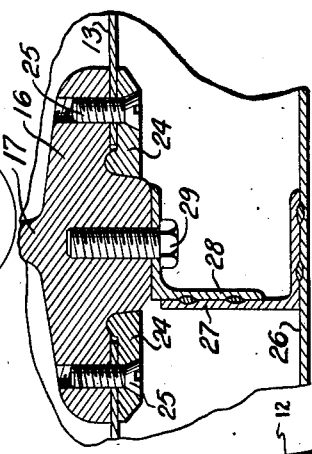
Fig. 8 is a fragmentary sectional view taken along the line 8—8 of Fig. 2.

Referring to Fig. 1, the tank proper comprises five distinct tank sections including a central cylindrical tank section A, forward and rear end tank sections B and C and intermediate tank sections D and E, respectively, joining the end tank sections B and C with the central tank section A. The longitudinal walls of the end tank sections B and C are each formed as the frustrum of a right cone having its base at the intersection with the intermediate tank section D or E and having longitudinal walls gradually converging toward the ends of the tank 10 and 11. The intermediate sections D and E are each formed as the frustrum of a scalene cone in a manner such that the intersections of the intermediate sections D and E with the end tank sections B and C and central tank section A are each true circles as is every other transverse section taken through any portion of the tank.

Figure 3:
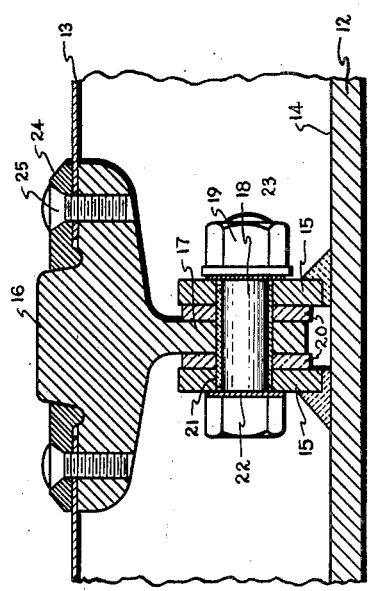
Fig. 3 is an enlarged fragmentary sectional view of a typical ring stiffener supporting connection between the inner tank and outer shell.

The entire tank is provided with a double wall construction including a relatively thick inner wall 12 and light outer shell 13 as shown most clearly in Fig. 3. Pairs of spaced annular rings 15 are welded to the outer surface 14 of the inner tank 12 at stations along the longitudinal axis thereof. Annular ring stiffeners 16 formed of aluminum extrusions are provided with an inner flange 17 which extends between the ring members 15 being connected thereto by a plurality of bolts 18 and nuts 19. Insulating pads 20 are interposed between the flange 17 and rings 15 separating such members from metal to metal contact and thereby inhibiting the transfer of heat between the inner tank 12 and the ring stiffeners 16 and outer shell 13. Individual bolts 18 are also insulated from the rings 15 and flange 17 by a sleeve 21 and end washers 22, 23. The outer shell 13 is formed of sheet metal aluminum sections extending between the ring stiffeners 16 being secured thereto by annular clamping rings 24 and screws 25.

Figure 2:
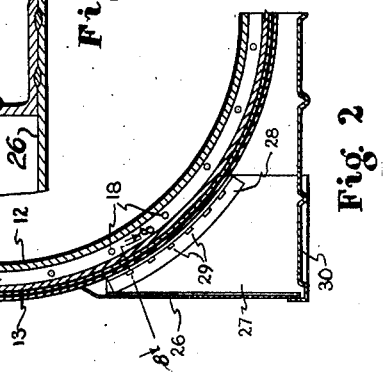
Fig. 2 is a fragmentary sectional view taken along the line 2—2 of Fig. 1.

Extending longitudinally along either side of the lower surface of the tank auxiliary girder members 26 are employed to provide additional support to the lower surface of the tank. As shown in Fig. 2, such girders are connected to the ring stiffeners 16 by means of longitudinally spaced gusset plates 27, angular members 28 and studs 29. A bottom plate 30 is provided to extend between the girder members 26 on either side of the tank serving to protect the lower surface of the tank shell 13 from damage as well as to hold and strengthen the girder members 26.

Insulating material, not shown, may be inserted between the tank wall 12 and outer shell 13 if the insulating requirements are not sufficiently met by air space alone.

It may be seen that with this construction the longitudinally extending surfaces of the inner tank may be fabricated entirely of flat plate cut to conform to the developed shape of the cylindrical and conical sections A, B, C, D and E, such plate being then rolled to form the circular transverse contour and welded together as a unitary structure. By welding the rings 15 to the outer surface of the tank wall 12, the connection with the ring stiffeners 16 previously described may be provided without necessity for interrupting the smooth interior surface of the tank wall 12 with any projecting members which might interfere with the thorough cleaning of interior tank wall surfaces.

Fluid is loaded into the tank through a filler dome 31 and unloaded through a drain valve at the bottom of the tank, not shown. Neither of these members form any part of the present invention and are therefore not described in detail.

Figure 4:
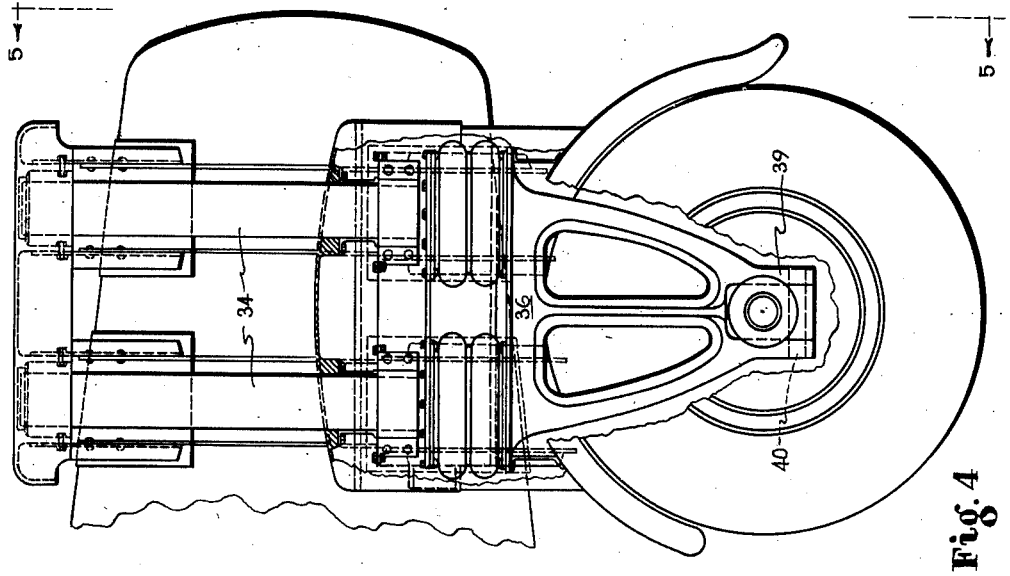
Fig. 4 is an enlarged side elevation of the rear end of the tank trailer showing the detail of the air sprung running gear.
Figure 5:
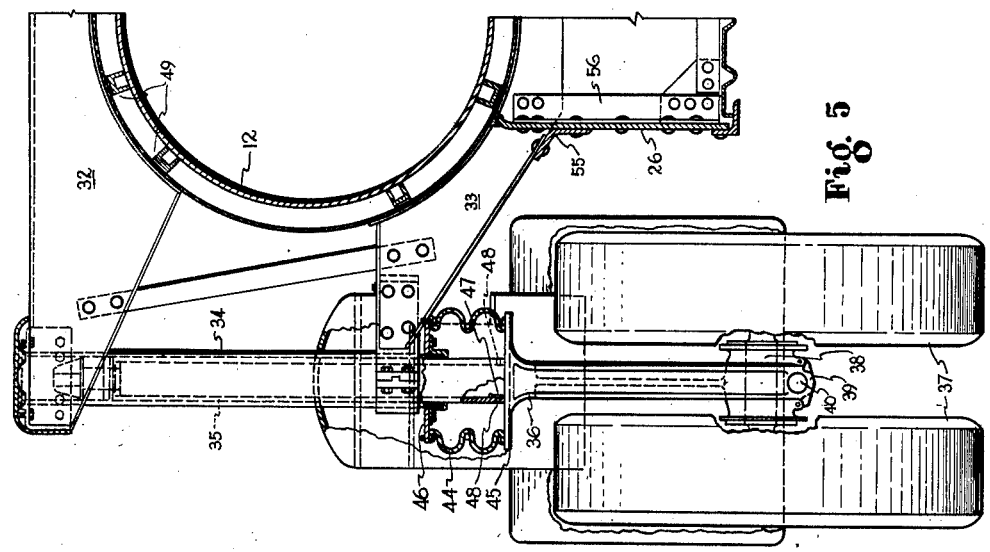
Fig. 5 is a partial end elevation taken along the line 5—5 of Fig. 4 with certain sections cut away to show details of construction.
Figures 6, 7:
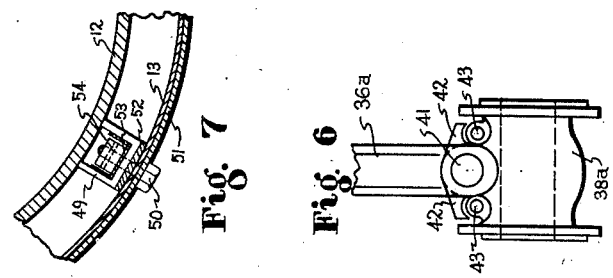
Fig. 6 is an alternative suspension for the dual wheel axle shown in Fig. 5 having the pivotal connection at the top of the axle.
Fig. 7 is a fragmentary view showing in detail a typical connection between the supporting saddle and inner tank, four of which appear in Fig. 5.

On the rear end of the tank a rear running gear is suspended as shown in detail in Figs. 4 and 5. The parts of such rear running gear associated with the tank include transverse upper saddles 32 and lower saddles 33 extending outwardly to either side of the tank. A pair of vertical cylinders 34 on either side of the tank are rigidly connected at their upper and lower ends to the upper and lower saddles 32, 33 respectively. Associated with each of the fixed cylinders 34 is a tubular piston 35 sealed at its upper end and adapted to slide vertically within the fixed cylinder 34. Such piston members are rigidly connected by suitable means to a bracket member 36 which extends downwardly between a pair of dual wheels 37. The axle housing 38 for such wheels is pivotally connected to the lower yoke-shaped end 39 of the bracket 36 by means of a longitudinally extending pin 40. Such pivotal connection permits the wheels 37 to rock within the limits of the clearance between the bracket member 36 and the wheels 37 in following irregular contours in the road surface, positive stops being provided to limit the rocking movement of the wheels 37 to the extent of such clearance. These positive stops are more clearly shown in the alternative construction of Fig. 6 wherein the pivotal connection 41 between the bracket 36a and axle housing 38a is provided on the top of the axle housing. As shown therein, lugs 42 on either side of the bracket 36a are adapted to engage pins 43 seated in the axle housing 38a to limit the rocking movement of the axle housing in either direction. It will be noted that the alternative pivotal connection at the top of the axle housing 38a permits a somewhat greater angle of rock for any given clearance between the wheels 37 and bracket 36 at the expense of somewhat greater lateral shifting in the lower surface of the wheels 37.

An air spring bellows 44 is suitably connected at its lower end to an annular flange 45 in the bracket 36 associated with each piston 35 and at its upper end to an annular flange 46 provided at the lower end of the fixed cylinder 34. Air pressure within the bellows 44 as well as within the tubular piston 35 serves to cushion the tank against road shock transmitted to the wheels 37 and a shock absorber effect is obtained by providing one-way valve means 47 to block the communication of air between the interior of the air spring 44 and piston 35 through certain of the air passages 46 upon the return stroke of the piston 35. In this manner the combined volume of air within the bellows 44 and piston 35 is available for compression due to the free passage of air from the bellows to the interior of the piston upon a compression stroke and a restricted communication provided by the one-way valve means 47 for the return of air from the interior of the piston 35 to the bellows 44 serves to dampen the return stroke in the manner of a shock absorber.

The saddle members 32 and 33 are connected to the inner tank 12 by means of longitudinally extending channel members 49 which are welded to the outer surface of the inner tank wall 12. The detail of these connections is shown in the enlarged view of Fig. 7 wherein it may be seen that bolts 50 pass through the flange 51 of the saddle, the outer shell 13, an insulating pad 52 and insulating washer 53 and are firmly held in place by lock nuts 54. It may be seen that in this manner the insulation between the inner tank 12 and outer shell 13 is maintained in the saddle connections as well as throughout the rest of the tank. The lower saddles 33 are also rigidly attached to the longitudinal girder 26 at points of intersection by means of suitable anlges 55, 56 which are riveted to the respective parts.

While a specific embodiment of my invention has been described above in detail, it will be understood that a number of modifications may be made in the detailed construction without departing from the scope of the following claims.

I claim:

1. A tank trailer for transporting fluid loads at abnormal temperatures characterized by a fabricated sheet metal tank comprising inner and outer spaced tank shells each comprising a cylindrical central tank portion having a horizontal axis along the direction of travel, forward and rear end tank portions having substantially horizontal axes and being of smaller cross section than said central portion, an intermediate conical tank portion joining each of said end portions with one end of said central portions, a plurality of ring stiffeners encircling and joining the various sections of said outer shell each being provided with an annular web extending inwardly through said outer shell, a plurality of ring stiffeners connected to the outer surface of said inner shell each of said latter stiffeners being opposed to one of said first-mentioned stiffeners and provided with an outwardly extending annular web, and insulated connecting means between said opposed webs whereby said inner shell is supported within said outer shell.

2. A tank trailer for transporting fluid loads at abnormal temperatures characterized by a fabricated sheet metal tank comprising inner and outer spaced tank shells each comprising a cylindrical central tank portion having a horizontal axis along the direction of travel, forward and rear end tank portions having substantially horizontal axes and being of smaller cross section than said central portion, an intermediate conical tank portion joining each of said end portions with one end of said central portions, a plurality of ring stiffeners encircling and joining the various sections of said outer shell each being provided with an annular web extending inwardly through said outer shell, a plurality of ring stiffeners connected to the outer surface of said inner shell, each of said latter stiffeners being opposed to one of said first-mentioned stiffeners and provided with an outwardly extending annular web, insulated connecting means between said opposed webs whereby said inner shell is supported within said outer shell, and a supporting framework extending along either side of each of said outer shell tank portions and connected to said first-mentioned stiffeners at points lower than their respective centers.

3. A tank trailer for transporting fluid loads at nonatmospheric temperatures characterized by an outer metallic shell of relatively light gauge material, an inner metallic tank spaced from said outer shell constructed of a relatively heavier gauge material capable of withstanding substantial load stresses imparted thereto, a plurality of opposed annular ring members connected respectively to said inner tank and outer shell adapted to transmit support directly to said inner tank without substantially stressing the outer shell, and heat insulated connecting means interposed between said annular ring members in a manner whereby metal-to-metal contact between said inner tank and outer shell may be substantially eliminated.

4. A tank adapted for use in a tank trailer characterized by a double-walled tank construction suitable for insulating against heat transfer, the inner tank having a relatively heavy metal wall capable of withstanding substantial load stresses, a pair of heavy annular spaced ring members welded at intervals to the exterior surface of the inner tank, heavy T-shaped annular ring members each having an inwardly extending leg adapted to extend between a pair of said annular ring members and having flanges at the outer surface suitable for connecting sections of the relatively light outer shell, said T-shaped ring member being also adapted for directly supported connection to the supporting framework of the trailer, and insulated connecting means interposed between said pair of annular ring members and the leg of the T member extending therebetween whereby a metal-to-metal path for heat transfer between the inner tank and outer shell may be substantially avoided.

EDWARD MULLEN.

REFERENCES CITED

The following references are of record in the file of this patent:

UNITED STATES PATENTS

| Number | Name | Date |
| --- | --- | --- |
| D. 138,549 | Ziegler | Aug. 15, 1944 |
| 814,880 | Small et al. | Mar. 13, 1906 |
| 1,908,684 | Buchanan | May 16, 1933 |
| 2,041,320 | Bradley et al. | May 19, 1936 |
| 2,059,318 | de Merce | Nov. 3, 1936 |
| 2,117,397 | Bonsall | May 17, 1938 |
| 2,160,477 | Kramer | May 30, 1939 |
| 2,180,876 | Kuhn | Nov. 21, 1939 |
| 2,237,310 | Norbom | Apr. 8, 1941 |
| 2,250,139 | Shimer | July 22, 1941 |
| 2,358,190 | Theriault | Sept. 12, 1944 |